(12) United States Patent
Kim et al.

(10) Patent No.: US 11,558,197 B2
(45) Date of Patent: Jan. 17, 2023

(54) METHOD FOR UNLOCKING MOBILE DEVICE USING AUTHENTICATION BASED ON EAR RECOGNITION AND MOBILE DEVICE PERFORMING THE SAME

(71) Applicant: KOREA INSTITUTE OF SCIENCE AND TECHNOLOGY, Seoul (KR)

(72) Inventors: Ig Jae Kim, Seoul (KR); Gi Pyo Nam, Seoul (KR); Junghyun Cho, Seoul (KR); Heeseung Choi, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 364 days.

(21) Appl. No.: 16/845,362

(22) Filed: Apr. 10, 2020

(65) Prior Publication Data
US 2020/0328897 A1 Oct. 15, 2020

(30) Foreign Application Priority Data

Apr. 10, 2019 (KR) .......... 10-2019-0041958
Mar. 19, 2020 (KR) .......... 10-2020-0033734

(51) Int. Cl.
| | |
|---|---|
| *H04L 9/32* | (2006.01) |
| *G06F 21/32* | (2013.01) |
| *G06F 3/0488* | (2022.01) |
| *G06T 7/73* | (2017.01) |
| *H04M 1/72484* | (2021.01) |
| *G06V 40/60* | (2022.01) |
| *G06V 40/16* | (2022.01) |

(52) U.S. Cl.
CPC .......... *H04L 9/3231* (2013.01); *G06F 3/0488* (2013.01); *G06F 21/32* (2013.01); *G06T 7/74* (2017.01); *G06V 40/171* (2022.01); *G06V 40/67* (2022.01); *H04M 1/72484* (2021.01);
(Continued)

(58) Field of Classification Search
CPC .......... G06F 21/32; G06F 21/33; G06F 21/36; G06F 16/58; G06F 21/31; G06V 40/168; G06V 40/172; G06V 40/10; G06V 40/16; G06V 40/165; G06V 40/15; G06T 7/00; G06T 2207/30201
See application file for complete search history.

(56) References Cited

U.S. PATENT DOCUMENTS

| | | | |
|---|---|---|---|
| 9,613,200 B2 | 4/2017 | Boczek | |
| 10,303,866 B1 * | 5/2019 | Van Os | .......... G06V 40/67 |
| (Continued) | | | |

FOREIGN PATENT DOCUMENTS

| | | |
|---|---|---|
| JP | 2007-206833 A | 8/2007 |
| KR | 100478856 B1 | 3/2005 |
| (Continued) | | |

OTHER PUBLICATIONS

Liu et al., "Online 3D Ear Recognition by Combining Global and Local Features" (Year: 2016).*

*Primary Examiner* — Dung Hong
(74) *Attorney, Agent, or Firm* — Cantor Colburn LLP

(57) ABSTRACT

Exemplary embodiments relate to a method for unlocking a mobile device using authentication based on ear recognition including obtaining an image of a target showing at least part of the target's body in a lock state, extracting a set of ear features of the target from the image of the target, when the image of the target includes at least part of the target's ear, and determining if the extracted set of ear features of the target satisfies a preset condition, and a mobile device performing the same.

21 Claims, 11 Drawing Sheets

(52) U.S. Cl.
CPC ............... *G06T 2207/30004* (2013.01); *G06T 2207/30201* (2013.01)

(56) References Cited

U.S. PATENT DOCUMENTS

| | | | |
|---|---|---|---|
| 2013/0015946 A1* | 1/2013 | Lau | G06V 10/422 340/5.2 |
| 2013/0094770 A1* | 4/2013 | Lee | G06F 21/36 345/173 |
| 2015/0074418 A1 | 3/2015 | Lee et al. | |
| 2015/0269419 A1 | 9/2015 | Bae et al. | |
| 2016/0026781 A1 | 1/2016 | Boczek | |
| 2017/0076077 A1 | 3/2017 | Zhao et al. | |
| 2017/0116490 A1 | 4/2017 | Han et al. | |
| 2019/0266427 A1 | 8/2019 | Chang et al. | |

FOREIGN PATENT DOCUMENTS

| | | | |
|---|---|---|---|
| KR | 1020050060628 A | 6/2005 | |
| KR | 100714112 B1 | 5/2007 | |
| KR | 1020120068655 A | 6/2012 | |
| KR | 101432484 B1 | 9/2014 | |
| KR | 101465036 B1 | 11/2014 | |
| KR | 1020150029495 A | 3/2015 | |
| KR | 1020150069799 A | 6/2015 | |
| KR | 101581618 B1 | 12/2015 | |
| KR | 10-2017-0046448 A | 5/2017 | |
| KR | 10-2018-0109634 A | 10/2018 | |
| KR | 1020190101841 A | 9/2019 | |
| WO | WO-2015117674 A1 * | 8/2015 | ............. G06F 21/32 |

\* cited by examiner

United States Patent US 11,558,197 B2

METHOD FOR UNLOCKING MOBILE DEVICE USING AUTHENTICATION BASED ON EAR RECOGNITION AND MOBILE DEVICE PERFORMING THE SAME

DESCRIPTION OF GOVERNMENT-FUNDED RESEARCH AND DEVELOPMENT

This research is conducted by Korean Institute of Science and Technology and funded by the convergent cognitive technology development program (National Research Foundation of Korea, project serial number: 1711094167) in the Ministry of Science and ICT.

CROSS-REFERENCE TO RELATED APPLICATION

This application claims priority to Korean Patent Application No. 10-2019-0041958, filed on Apr. 10, 2019, and No. 10-2020-0033734, filed on Mar. 19, 2020 and all the benefits accruing therefrom under 35 U.S.C. § 119, the contents of which in its entirety are herein incorporated by reference.

BACKGROUND

1. Field

The present disclosure relates to mobile unlocking, and more particularly, to a method for unlocking a mobile device in which a target's ear is recognized to identify if the target is a registered user of a mobile device, and a lock state is changed to an unlock state according to the identification result, and a mobile device performing the same.

2. Description of the Related Art

Since Apple launched iPhone, there has been an exploding demand for mobile devices (for example, including smart phones) inside and outside the country.

The mobile devices use touch as a main input method. Unintended touch input causes unnecessary power losses. To reduce power losses, the mobile devices do not respond to most of touch inputs and are kept locked until users start using the mobile devices. While locked, the mobile devices only respond to limited permitted input, and when a predetermined unlock condition is satisfied, they are unlocked.

Recently, with the growing number and importance of personal information of possessors stored in mobile devices, there is a movement toward a combination of unlocking and secure authentication of mobile devices. Mobile devices firmly entrench in modern lives, and people spend a considerable amount of time in the entire hour of activity many times a day in interacting with their mobile devices. Accordingly, input required for authentication to make the mobile devices secure should not cause inconvenience to users.

In the case of mobile device unlocking methods, in an early stage after smart phones had been introduced, unlocking was carried out through users' pattern or password input (Patent Literature 1). However, this direct input method poses an exposure problem. To solve this problem, some approaches propose setting patterns or passwords to make them more complex, but users may forget the set patterns or passwords, and it takes a long time to perform a user input process for unlocking, reducing the user convenience.

To address the security issue and inconvenience, unlocking methods based on biometric authentication using users' biometric information are used. Unlocking is chiefly carried out through authentication using fingerprint, face and iris information, and biometric information is currently used in untact authentication methods for financial services.

Due to the recent trends in smaller buttons and a larger screen, facial recognition or iris recognition methods are more popular than fingerprint recognition methods. As an authentication attempt is made through an embedded front facing camera, the facial recognition or iris recognition does not require a separate sensor and may be immediately used without users' direct contact (Patent Literatures 2 and 3). However, when wearing accessories such as sunglasses or masks, the authentication success rate is low.

SUMMARY

Exemplary embodiments of the present disclosure provide a method for unlocking a mobile device in which a target's ear is recognized to identify if the target is a registered user of a mobile device, and a lock state is changed to an unlock state according to the identification result, and a mobile device performing the same.

A method for unlocking a mobile device using authentication based on ear recognition according to an aspect of the present disclosure is performed by the mobile device including an imaging unit, a display unit and a processor. The unlocking method may include sensing an unlock attempt in a lock state, obtaining an image of a target showing at least part of the target's body in the lock state, extracting a set of ear features of the target from the image of the target, when the image of the target includes at least part of the target's ear, and determining if the extracted set of ear features of the target satisfies a preset condition.

In an embodiment, extracting the set of ear features of the target may include applying the detected ear region to a global feature analysis model configured to extract a set of first features for a global feature of the ear, and applying the detected ear region to a local feature analysis model configured to extract a set of second features for a local feature of the ear.

In an embodiment, the global feature analysis model or the local feature analysis model may be configured to extract the set of first features or the set of second features using multiple images obtained from a same training target as a training image, and the multiple images may share at least part of the training target's ear.

In an embodiment, the global feature of the ear may include at least one of a contour of the ear and a structure of the ear, and the local feature of the ear may include a local pattern present in the ear.

In an embodiment, determining if the extracted set of ear features of the target satisfies the preset condition may include calculating similarity of the ear features between the target and a user of the mobile device by comparing the set of first features and the set of second features with stored set of first features and set of second features of the user, and changing a first interface state to a second interface state when a similarity match level is higher than a predetermined threshold.

In an embodiment, calculating the similarity of the ear features between the target and the user may include calculating a first similarity representing a similarity level of the global features of the ear between the target and the user of the mobile device by comparing the set of first features of the target with the stored set of first features of the user, calculating a second similarity representing a similarity level of the local features of the ear between the target and the user of the mobile device by comparing the set of second features of the target with the stored set of second features of the user, and calculating the similarity of the ear features between the target and the user by concatenating the first similarity and the second similarity.

In an embodiment, the method may further include correcting a shooting angle of the target image or the image of the ear region based on a motion change of the mobile device, when the motion change of the mobile device is sensed, before applying to the global feature analysis model or the local feature analysis model.

In an embodiment, the lock state includes a normal lock state. Additionally, the method for unlocking a mobile device may further include displaying a screen showing at least one application interface object, when the extracted set of ear features of the target is determined to satisfy the preset condition.

In an embodiment, the lock state further includes an unlock state. Additionally, the method for unlocking a mobile device may further include changing from the normal lock state to the unlock state, and notifying the state change, before displaying the screen showing the at least one application interface object.

In an embodiment, the lock state includes a normal lock state and an application lock state, and the method for unlocking a mobile device may include displaying an interface screen corresponding to an occurred event, when the event occurs in the normal lock state, and performing an operation of an application corresponding to the event, after the extracted set of ear features of the target is determined to satisfy the preset condition.

In an embodiment, the event includes an incoming call, and connection of the incoming call may be performed, after the extracted set of ear features of the target is determined to satisfy the preset condition.

In an embodiment, the lock state includes a normal lock state, an unlock state and an application lock state, and the method for unlocking a mobile device may further include receiving an unlock input that is different from ear recognition and displaying a screen showing at least one application interface object, displaying an interface screen corresponding to an occurred event, when the event occurs in the unlock state, and performing an operation of an application corresponding to the event, after the extracted set of ear features of the target is determined to satisfy the preset condition. Here, the image of the target is obtained after the event occurs.

In an embodiment, the different unlock input may include at least one of touch, a non-touch gesture, typing, voice, and imaging of a different body part from the ear.

In an embodiment, the event includes an incoming call, and acceptance of reception of the incoming call may be performed, after the extracted set of ear features of the target is determined to satisfy the preset condition.

In an embodiment, the method may further include providing the target with a notification to adjust a distance between the mobile device and the target, when a brightness level of the mobile device is equal to or lower than a threshold, before detecting the ear region.

In an embodiment, the method may further include determining if the detected ear region includes at least part of the target's ear, before extracting the set of ear features, determining if a size of the detected ear region falls inside a predetermined size range, when the detected ear region includes the at least part of the target's ear, and providing the target with a notification to adjust a distance between the mobile device and the target to obtain the ear region falling inside the predetermined size range, when the size of the detected ear region is outside of the predetermined size range.

In an embodiment, sensing the unlock attempt in the lock state may include determining that the unlock attempt is sensed, when sensing at least one of a change in rotation angle of the mobile device within a preset range for a preset unit time, and brightness maintained within the preset range for the preset unit time, and activating ear recognition for unlocking.

A computer-readable recording medium according to another aspect of the present disclosure may be read by a computing device including a processor, and may store program instructions that may be executed by the computing device. Here, when the program instructions are executed by the processor of the compute, the processor may perform the method for unlocking a mobile device according to the present disclosure.

A mobile device according to still another aspect of the present disclosure may include an imaging device to obtain an image of a target, a display, a processor, and a memory to store a program configured to be executed by the processor. Here, the program includes instructions for performing the steps of sensing an unlock attempt in a lock state, obtaining an image of a target showing at least part of the target's body in the lock state, extracting a set of ear features of the target from the image of the target, when the image of the target includes at least part of the target's ear, and determining if the extracted set of ear features of the target satisfies a preset condition.

In an embodiment, the lock state includes a normal lock state, and the program may further include instructions for performing the step of displaying a screen showing at least one application interface object, when the extracted set of ear features of the target is determined to satisfy the preset condition.

In an embodiment, the lock state includes a normal lock state and an application lock state, and the program may further include instructions for performing the steps of displaying an interface screen corresponding to an occurred event, when the event occurs in the normal lock state, and performing an operation of an application corresponding to the event, after the extracted set of ear features of the target is determined to satisfy the preset condition.

In an embodiment, the mobile device may further include at least one of a touch unit to obtain a touch input, other input unit to obtain an input that is different from touch and a microphone, the lock state includes a normal lock state, an unlock state and an application lock state, and the program may further include instructions for performing the steps of receiving an unlock input that is different from ear recognition and displaying a screen showing at least one application interface object, displaying an interface screen corresponding to an occurred event, when the event occurs in the unlock state, and performing an operation of an application corresponding to the event, after the extracted set of ear features of the target is determined to satisfy the preset condition.

The mobile device according to an aspect of the present disclosure is unlocked by recognizing the ear, so it is possible to perform an unlock operation even when a target's face is covered with sunglasses, masks or the like. In this process, it is possible to unlock by performing authentication through the mobile device without recognition performance degradation issues when the target wears accessories such as sunglasses, masks or the like.

Additionally, when an event (for example, an incoming call) placing the mobile device close to the ear occurs, the mobile device can unlock and run an application corresponding to the event, thereby enhancing the security of the mobile device.

Further, unlocking based on ear recognition may be used in untact authentication for finance related tasks.

The effects of the present disclosure are not limited to the above-mentioned effects, and other effects not mentioned herein will be clearly understood by those skilled in the art from the appended claims.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and not intended to be limiting of the present disclosure. Additionally, for clarity of description, the accompanying drawings may show variously modified elements such as exaggerated and omitted elements.

DETAILED DESCRIPTION

The terminology used herein is for the purpose of describing particular embodiments and not intended to be limiting of the present disclosure. Unless the context clearly indicates otherwise, the singular forms as used herein include the plural forms as well. The term "comprises" or "includes" when used in this specification, specifies the presence of stated features, regions, integers, steps, operations, elements, and/or components, but does not preclude the presence or addition of one or more other features, regions, integers, steps, operations, elements and/or components.

Unless otherwise defined, all terms (including technical and scientific terms) used herein have the same meaning as commonly understood by those skilled in the art. It is further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

Hereinafter, the embodiments of the present disclosure will be described in detail with reference to the accompanying drawings.

Figure 1:
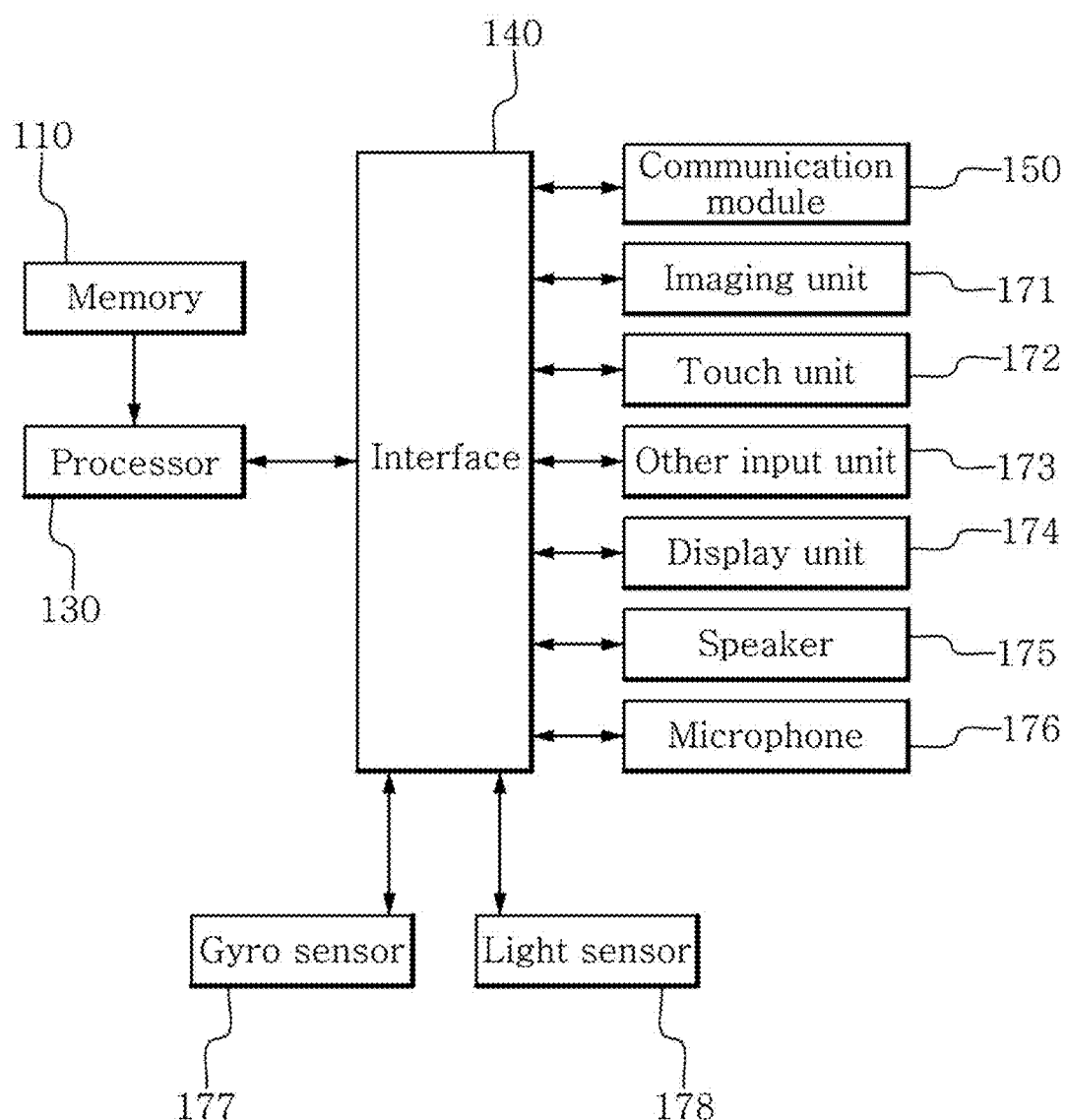
FIG. 1 is a schematic block diagram of a mobile device according to an embodiment of the present disclosure.

FIG. 1 is a schematic block diagram of a mobile device according to an embodiment of the present disclosure.

In the embodiments, the mobile device 100 is configured to obtain an ear image of a target, recognize the target's ear and perform at least one operation of changing a lock state to an unlock state. For example, the mobile device 100 may be implemented as a smart phone, a cellular phone, a smart glass, a smart watch, a wearable device, a digital camera, a tablet, a notebook computer and a laptop computer, but is not limited thereto.

Referring to FIG. 1, the mobile device 100 includes a memory 110, a processor 130; an interface 140; a communication module 150; and at least one interface unit to input/output information. The interface unit includes an imaging unit 171, a touch unit 172, and a display unit 174. In some embodiments, the interface unit further includes other input unit 173, a speaker 175 and a microphone 176. In some embodiments, the mobile device 100 may further include a gyro sensor 177 and/or a light sensor 178. Additionally, the mobile device 100 may further include an acceleration sensor (not shown).

The mobile device 100 according to the embodiments may have aspects of entirely hardware, entirely software, or partly hardware and partly software. For example, the mobile device 100 may refer collectively to hardware having data processing capability and software that manages the hardware. The term "unit", "module", "device", or "system" as used herein is intended to refer to a combination of hardware and software that is executed by the corresponding hardware. For example, the hardware may be a computing device that can process data, including a Central Processing Unit (CPU), a Graphic Processing Unit (GPU) or other processor. Additionally, the software may refer to a process being executed, an object, executable, a thread of execution and a program.

The memory 110 may include a nonvolatile memory. The nonvolatile memory may include, for example, solid state drive (SDD), hard disk drive (HDD) and flash memory, but is not limited thereto, and may include other nonvolatile semiconductor memory. In some embodiments, the memory 110 may further include a storage device remotely located outside of the mobile device 100, for example, a distributed storage that is accessed via a wired/wireless communication network.

The processor 130 is configured to perform data processing and/or image processing. The processor 130 may include a CPU and a GPU. Although FIG. 1 shows the processor 130 as a single component, the processor 130 is not limited thereto. For example, the processor 130 may be implemented as a single chip or multiple chips according to design.

The operation of the processor 130 will be described in more detail with reference to FIGS. 2 to 9 below.

The interface 140 connects devices related to input/output of the mobile device 100 to the memory 110 and/or the processor 130. The interface 140 may be implemented as a combination of software and/or hardware depending on the connected devices related to input/output. For example, the interface 140 may include an interface for communication, an interface for touch and other input unit and an interface for audio, the audio interface may include an audio circuit (for example, a headset jack) to convert data to an electrical signal and transmit the electrical signal, and the interface for touch and other input unit may include at least one input controller to transmit an electrical signal corresponding to a user input obtained through at least one input unit to the processor 130.

The communication module 150 is configured to transmit/receive an electromagnetic wave. The communication module 150 converts an electrical signal to an electromagnetic wave or an electromagnetic wave to an electrical signal. The mobile device 100 allows a user to make a call or use an application that provides services on the Internet, through the communication module 150. The communication module 150 may communicate with other device by a variety of communication methods including wired communication, wireless communication, 3G, 4G, wired Internet or wireless Internet to enable networking between objects. For example, the communication module 150 is configured to perform communication via a network such as Internet such as World Wide Web (WWW) and Intranet and/or a cellular phone network, a wireless network, and wireless communication. The wireless communication may include, for example, wireless communication standards using communication protocols for Global System for Mobile Network (GSM), Code Division Multiple Access (CDMA), Wideband Code Division Multiple Access (W-CDMA), Time Division Multiple Access (TDMA), Bluetooth, Wi-Fi, Worldwide Interoperability for Microwave Access (Wi-MAX), and/or an e-mail, instant messaging, a short message service (SMS), but is not limited thereto.

The imaging unit 171 is a component that obtains image data of an object by capturing an image of the object, and may be, for example, various types of imaging devices including an image sensor, a camera and a video camera.

The touch unit 172 and the other input unit 173 are components configured to receive a command related to the user input. Touch is inputted into the touch unit 172 using part of the user's body or other object as a pointing object. The touch unit 172 may include a pressure sensor or a capacitive sensor, but is not limited thereto. The other input unit 173 includes, for example, a button, a dial, a switch and a stick.

The display unit 174 is a component that displays information stored in and/or processed by the mobile device 100, and may include, for example, a liquid crystal display (LCD), an organic light-emitting diode (OLED) and a flexible screen, but is not limited thereto.

Although the touch unit 172 and the display unit 174 are separated in FIG. 1, in many embodiments, the touch unit 172 and the display unit 174 may be implemented as a single component to receive input and output information. For example, the touch unit 172 and the display unit 174 may be implemented as a touch screen having a touch panel that forms a layer structure with the screen. The touch input is inputted by the pointing object (for example, including the user's body or a tool).

The speaker 175 converts an electrical signal to a sound wave having an audible range of frequencies. The data processed by the processor 130 or data stored in the memory 110 is converted to an electrical signal through the interface 140 and inputted into the speaker 175, and finally, a sound wave is outputted. The microphone 176 converts a sound wave to an electrical signal. When the mobile device 100 is configured to run a phone application, the speaker 175 and the microphone 176 may be used for a call.

The gyro sensor 177 is a sensor that senses rotation of the object, and is configured to convert a physical change (for example, Coriolis Force) occurring when the mobile device 100 has a rotation motion to an electrical signal. The electrical signal is transmitted to the processor 130.

The light sensor 178 is a sensor that senses the ambient light level, and is configured to convert the ambient light intensity of the mobile device 100 to an electrical signal.

Hereinafter, for clarity of description, the present disclosure will be described in more detail based on the mobile device 100 implemented as a smart phone including a touch screen. However, it will be obvious to those skilled in the art that the above embodiment is provided by way of illustration, and the present disclosure is not limited thereto.

Identification Based on Ear Recognition

The mobile device 100 is configured to perform an ear recognition operation to identify an ear in an image.

Figure 2:
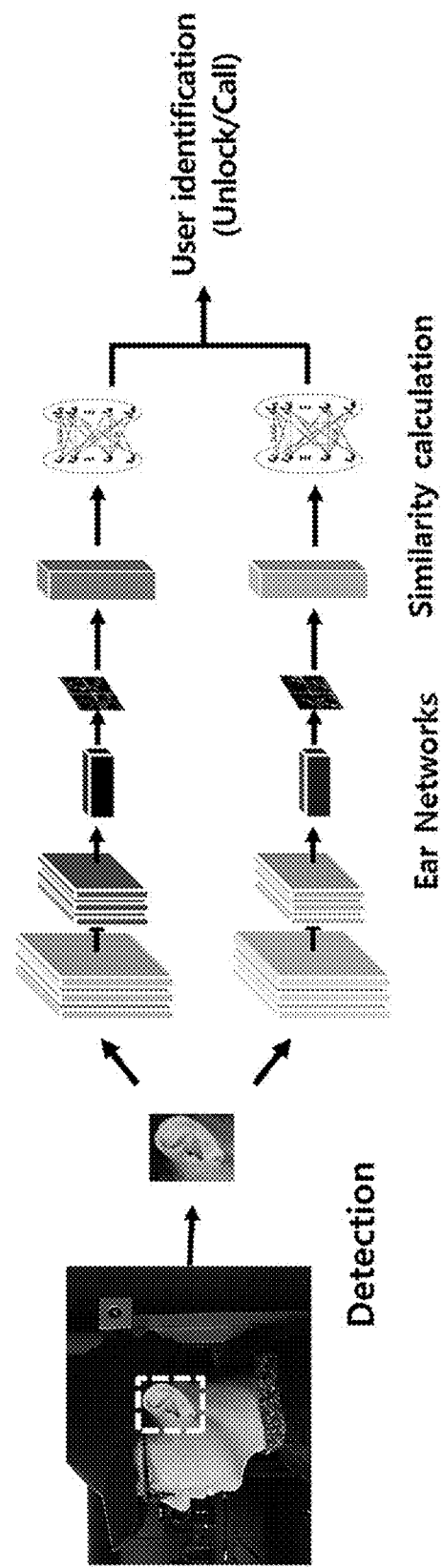
FIG. 2 is a diagram illustrating an operation of extracting ear feature according to an embodiment of the present disclosure.

FIG. 2 is a diagram illustrating an operation of extracting ear feature according to an embodiment of the present disclosure.

The mobile device 100 includes information of at least one candidate. In an embodiment, the candidate may be a person who is registered as a user of the mobile device 100.

The information of the candidate includes information to be used for an authentication operation to identify a target. The information of the candidate includes ear related feature (hereinafter, "ear feature") information of the candidate. The ear feature information includes a set of ear features including ear features representing individual and unique features of the candidate's ear. The ear features may be classified into a first feature or a second feature by an ear feature descriptor. The set of ear features will be described in more detail below.

Additionally, the information of the candidate may further include, for example, candidate ID information and candidate image information, but is not limited thereto.

The mobile device 100 obtains an image of the target (for example, by the imaging unit 171). The image of the target is an image showing at least part of the target's body.

In some embodiments, the image of the target may be an ear image including at least part of the target's ear. The ear image is obtained by imaging the face at the front or the side. That is, the image of the target is not limited to the side face image shown in FIG. 2.

The mobile device 100 detects an ear region in the image of the target. The mobile device 100 may detect the ear region in the image of the target through a region detection algorithm. The region detection algorithm includes, for example, algorithms for Haar, Convolution Neural Network (CNN), Scale Invariant Feature Transform (SIFT), Histogram of Gradients (HOG), Neural Network (NN), Support Vector Machine (SVM) and Gabor techniques, but is not limited thereto.

Additionally, the region detection algorithm may be an algorithm suited to detect the ear region by applying the ear features (for example, geometric features) based on the ear image.

As shown in FIG. 2, when the target image including the target's side face is obtained, the mobile device 100 may detect the ear region through the region detection algorithm as in FIG. 2.

Additionally, the mobile device 100 may create an image of the ear region. That is, the image of the ear region is extracted as a sub image from the image of the target.

Hereinafter, under the assumption that the mobile device 100 detected the ear region, the feature extraction process will be described.

The mobile device 100 extracts features representing the features of the ear included in the ear region. Ear differs in shape, skin texture and skin surface structure (for example, freckles, etc.) each person. That is, the unique features of the ear correspond to viewpoints at which the ear is analyzed. Accordingly, when comparison analysis of two ears is performed, determination may be made as to whether the two ears are identical or different based on the unique features of the ears.

The ear features include, for example, the whole or partial contour of the ear (for example, the size of the earlobe, the ratio of the earhole, etc.), skin texture, skeletal structure (for example, the shape of the earhole) and freckles, and a feature vector representing the ear features includes value(s) indicating each of the ear features represented through imaging.

The mobile device 100 extracts the features related to at least one ear feature from the image of the ear region. To this end, the mobile device 100 includes a pre-modeled ear feature analysis model. One or more features may be extracted by the ear feature analysis model, to form a set. The set of features may be referred to as a feature vector.

In an embodiment, the mobile device 100 may extract first features related to a global feature of the ear and/or second features related to a local feature of the ear from the ear region image. To this end, the mobile device 100 may include a global feature analysis model to output a first feature vector representing the global feature of the ear and/or a local feature analysis model to output a second feature vector representing the local feature of the ear.

The global feature is related to, for example, the whole contour or structure in the image. The global feature analysis model uses the whole ear region image in extracting the ear features. The global feature analysis model may extract the feature vector representing the global feature shown in the ear region image using a global feature descriptor method including, for example, Principal Component Analysis (PCA), Local Discriminant Analysis (LDA) and Independent Component Analysis (ICA), but is not limited thereto.

The local feature is a feature represented in a local pattern, and for example, is related to a local branch shape such as tragus and incisura of the ear, freckles on the ear, skin texture and wrinkles. The local feature analysis model may extract the feature vector representing the local feature shown in the ear region image using a local feature descriptor method including, for example, Convolution Neural Network (CNN), Local Binary Pattern (LBP), Scale Invariant Feature Transform (SIFT), Learning-based Encoding (LE) and Histogram of Oriented Gradient (HOG), but is not limited thereto.

In some embodiments, the global feature analysis model or the local feature analysis model is configured to extract the set of first or second features using multiple images obtained from the same training target as a training image. The multiple images share at least part of the ear of the training target.

In particular embodiments, in the training image, the ear feature analysis model and the threshold may include, for example, a front view face image and/or a side view face image.

Figure 3A:
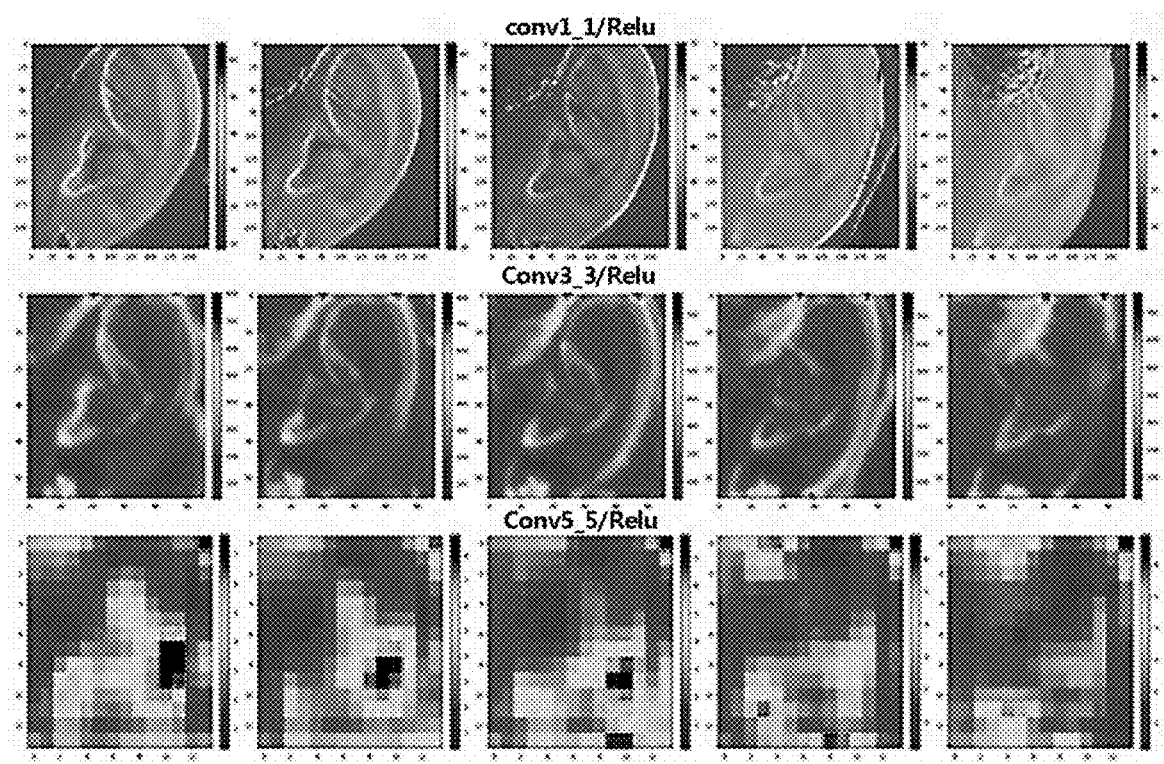
FIGS. 3A and 3B are diagrams showing images of various feature vectors that may be extracted by an ear feature analysis model according to an embodiment of the present disclosure.
Figure 3B:
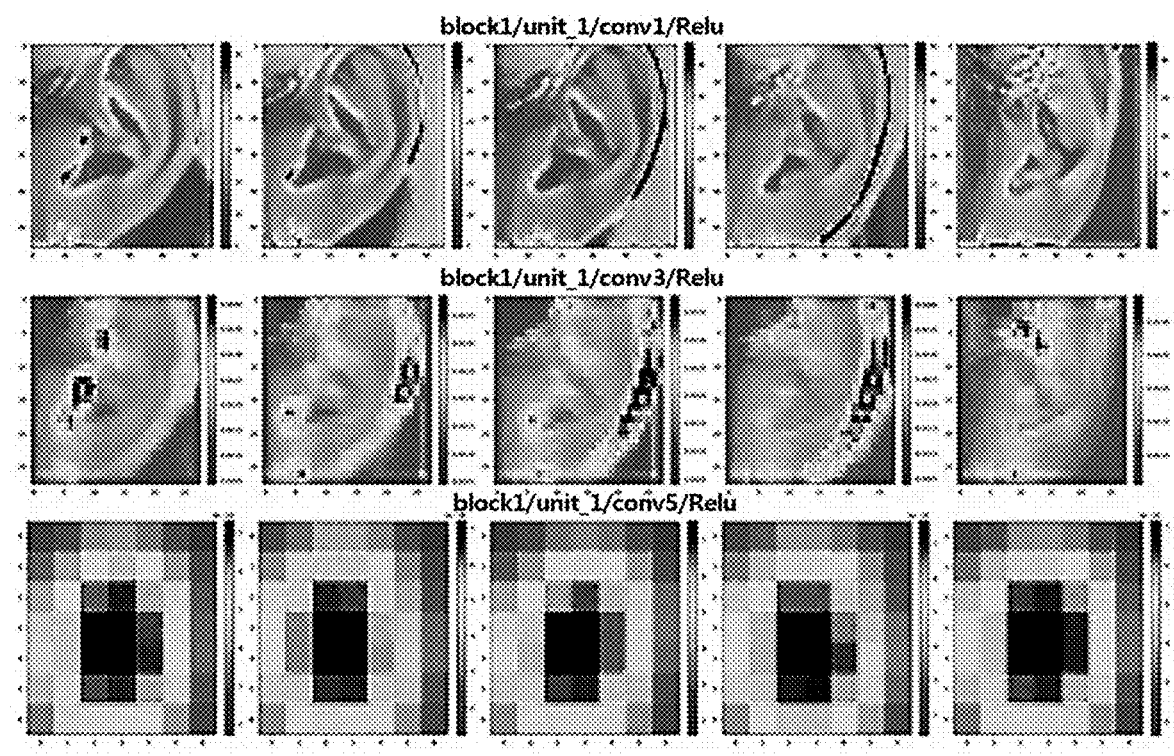

FIGS. 3A and 3B are diagrams showing images of various feature vectors that may be extracted from the ear feature analysis model according to an embodiment of the present disclosure.

As described above, the unique features of the ear of the target may be classified into the local feature or the global feature, and further, various feature descriptors are used (for example, to extract the local feature) even for the same feature, and thus, as shown in FIGS. 3A and 3B, various feature vectors appearing in various images are extracted from one ear region image. That is, the identification device 100 may analyze the ear features in various aspects by the settings of the ear feature analysis model.

The mobile device 100 determines if the extracted set of ear features of the target satisfies a preset condition. In some embodiments, when the preset condition is satisfied, the mobile device 100 may perform at least one operation based on the interface state. Additionally, the mobile device 100 identifies the target.

The preset condition includes whether or not ear similarity is higher than the threshold (Tscore).

The mobile device 100 calculates ear similarity between the target and the candidate by comparing the stored ear features of the candidate and the extracted ear features of the target.

The feature vector of the target and the feature vector of the candidate are compared by feature. For example, as shown in FIG. 2, the first feature vector representing the global feature of the target is compared with the first feature vector representing the global feature of the candidate, and the second feature vector representing the local feature of the target is compared with the second feature vector representing the local feature of the candidate.

Various similarity comparison algorithms may be used to calculate similarity between the ear features of the target and the ear features of the candidate by comparing the feature vector of the target and the stored feature vector of the candidate by feature. The similarity comparison algorithm may include, for example, Euclidean Distance, Cosine Distance and Mahalanobis Distance, but is not limited thereto.

Additionally, the mobile device 100 may calculate final similarity between the ear features of the target and the ear features of the candidate by concatenating the calculated similarities by feature.

The mobile device 100 may concatenate the similarities by feature (for example, similarity related to the local feature and similarity related to the global feature) through a concatenation method including, for example, SUM, MIN, MAX, PRODUCT, Weighted SUM, SVM, but is not limited thereto.

The calculated similarity being higher than the threshold (Tscore) and the condition being satisfied may be used to determine that there is a candidate that matches the target or determine if the stored candidate and the target match.

When the condition is satisfied, the mobile device 100 determines that the target's identity matches the candidate. When the candidate is a registered user of the mobile device 100, and the target is an actual registered user, similarity that is higher than the threshold (Tscore) will be calculated. Then, authentication is completed and the target is identified as a registered user. When the target is different from the registered user, similarity that is equal to or lower than the threshold (Tscore) is calculated, and authentication fails and the target is identified as a non-registered user.

The threshold (Tscore) may be a value that is determined in reliance on the extracted ear features, the similarity concatenation method and/or image characteristics used to extract the ear features.

For example, the threshold (Tscore) when only the local feature is extracted, or when only the global feature is extracted, or when both the global feature and the local feature are extracted, may be different from one another.

The image characteristics are characteristics of the image (for example, the ear region image) that are inputted into the model. The image characteristics include, for example, the percentage the ear occupies in the image, part of the ear appearing in the image and the shooting angle of the ear image, but are not limited thereto.

However, the threshold (Tscore) is not limited to the above-described embodiment. For example, the threshold (Tscore) may be a specific value that is set by the user's input.

In some embodiments, the mobile device 100 is configured to pre-process the ear image before extracting the features representing the ear features. It will be described in more detail with reference to FIG. 4B below.

User Interface Operation—Normal Lock and Unlock

The mobile device 100 may have a plurality of interface states. The interface state is an interface mode in which an operation responsive to a user input received by the mobile device 100 is predetermined according to the corresponding state in response to the user input. The mobile device 100 may display the screen related to the interface state. A change in interface state may be implemented as a change of the displayed screen or part of the screen.

In an embodiment, the interface state includes a normal lock state and an unlock state.

Additionally, the multiple interface states may include states of a plurality of applications installed in the mobile device 100.

In the normal lock state, the mobile device 100 is powered on and can work, but ignores most of user inputs. That is, in the normal lock state, the mobile device 100 does not perform any operation in response to the user input, and/or is disallowed to perform a set of operations of the mobile device 100 that is predetermined to operate in response to the user input. The set of predetermined operations includes navigation between activation or deactivation of a set of predetermined functions with a user interface (UI). Additionally, the mobile device 100 does not respond to the user input corresponding to a navigation attempt with the user interface. The lock state forbids an unintended or unauthenticated use of the mobile device 100 or activation or deactivation of the function on the mobile device 100.

In the normal lock state, the mobile device 100 responds to a set of limited user inputs including an input corresponding to an attempt to unlock or an input corresponding to power off.

The normal unlock state (hereinafter, "unlock state") is a normal operating state of the device 100, and in the unlock state, the mobile device 100 detects and responds to the user input corresponding to interaction with the user interface. In the unlock state, the mobile device 100 detects and responds to the user input for navigation with the user interface, data input and activation or deactivation of the function.

Figure 4A:
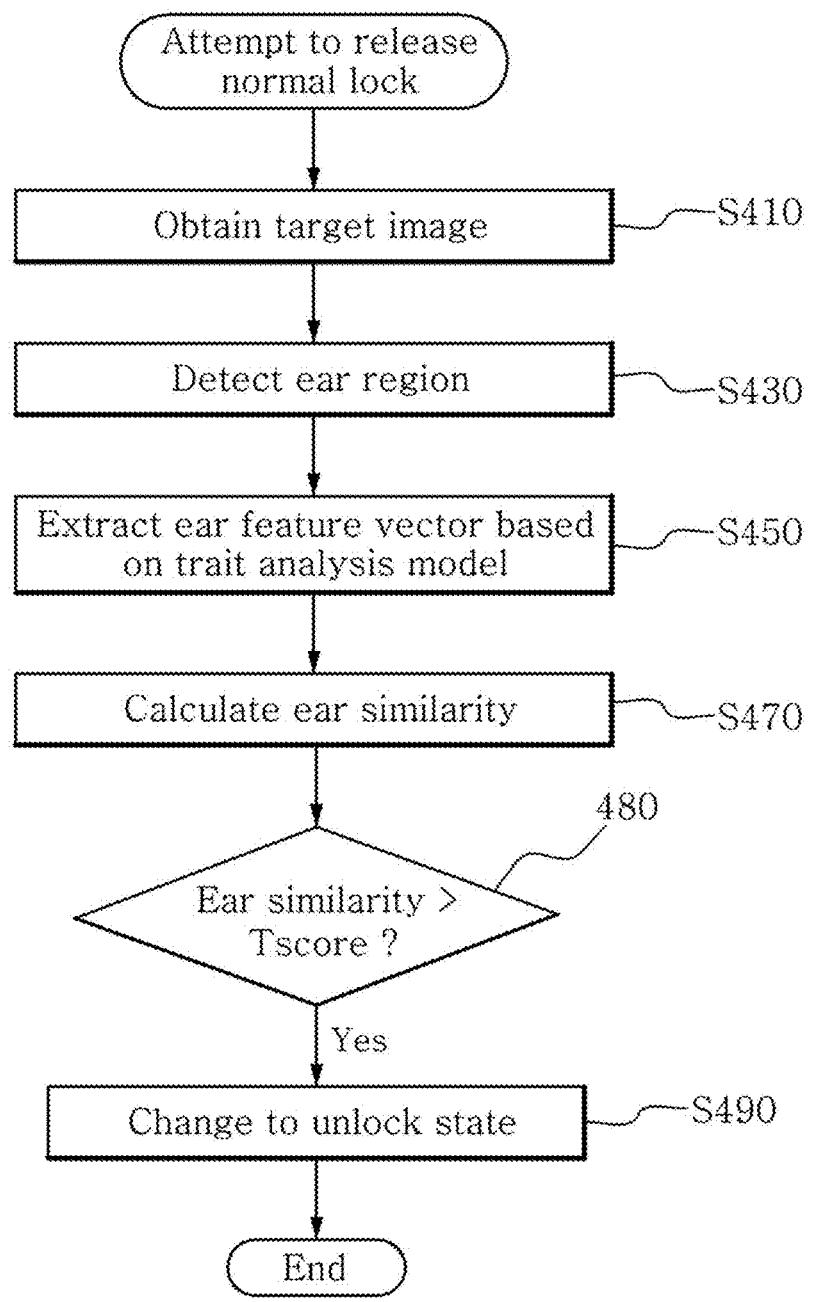
FIGS. 4A and 4B are flowcharts of a process of releasing normal lock state according to various embodiments of the present disclosure.
Figure 4B:
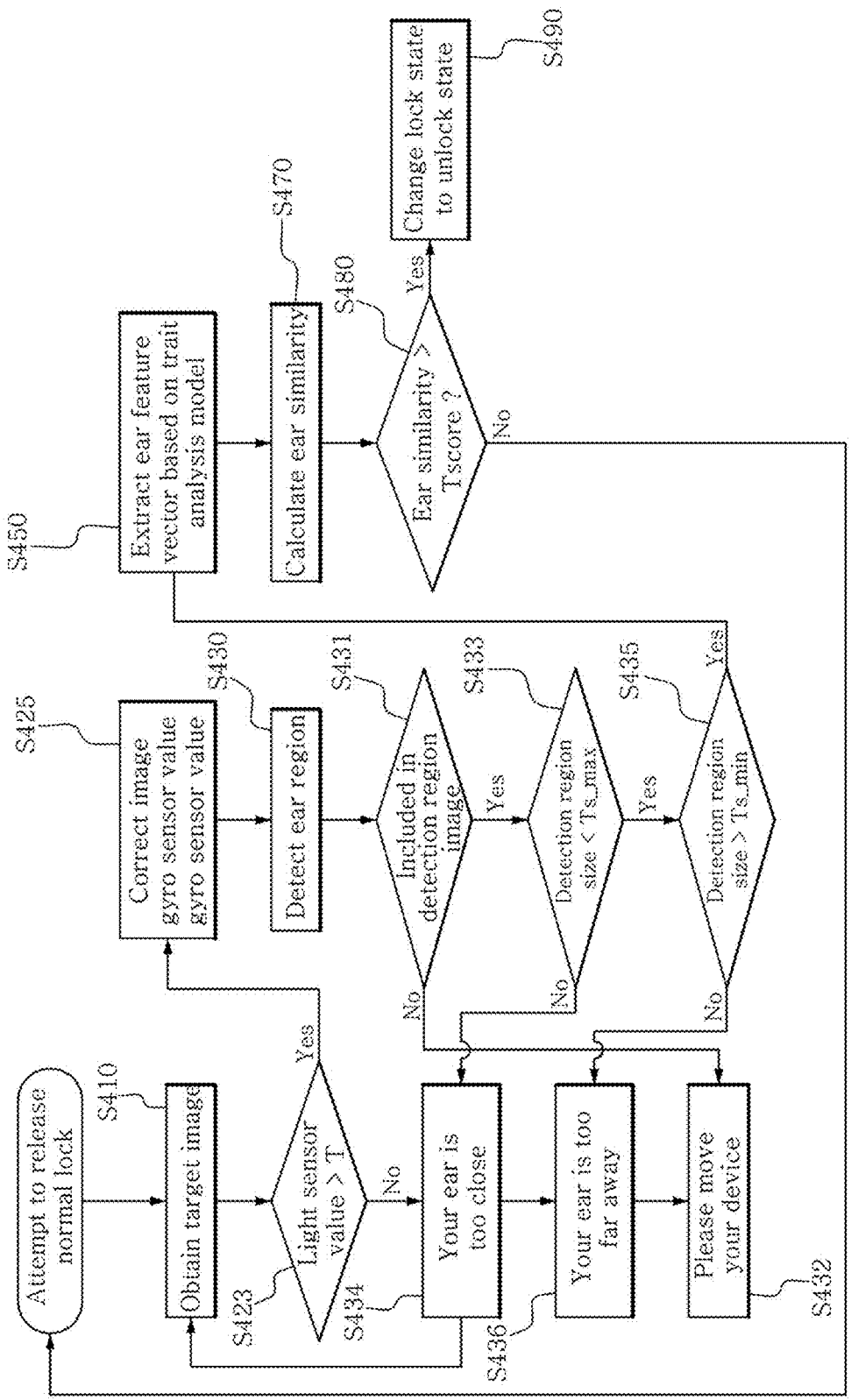

FIGS. 4A and 4B are flowcharts of a process of releasing the normal lock state according to various embodiments of the present disclosure.

Referring to FIG. 4A, the mobile device 100 may detect an unlock attempt to change from the normal lock state to the unlock state in the normal lock state.

When a specific physical change resulting from interaction between the user and the mobile device is detected, the mobile device 100 determines that there is an unlock attempt. When the unlock attempt is detected, the mobile device 100 activates an unlock operation. That is, an ear recognition operation is activated by the unlock attempt.

In an embodiment, the unlock attempt includes an arbitrary user input. For example, the unlock attempt may be an arbitrary user input received by touching a point in an input area on the mobile device 100 or pressing a button.

In some embodiments, the unlock attempt may be detected by the sensors included in the mobile device 100.

For example, when a rotation or angle change within a preset range is sensed by the gyro sensor 177 built in the mobile device 100 for a set unit time, and/or when a speed change within the preset range is sensed by the acceleration sensor for the set unit time, the mobile device 100 may determine that there is an unlock attempt.

Alternatively, the unlock attempt may be determined based on the sensing results of the plurality of sensors. For example, when location information is obtained by each of the gyro sensor 177 and the acceleration sensor, and a location change of the terminal within the preset range is sensed for the set unit time, and/or brightness within the preset range is maintained by the light sensor 178 for the set unit time, the mobile device 100 may determine that there is an unlock attempt.

That is, for example, when at least one of the above-described four cases is sensed, the mobile device 100 may determine that there is an unlock attempt, and this may be used as an operation attempt condition for unlocking the mobile device.

When the unlock attempt is detected, the mobile device 100 may perform an operation of unlocking the mobile device based on ear recognition in the normal lock state.

The mobile device 100 obtains a target image (S410). In some embodiments, the mobile device 100 may induce the target to image a specific body part in reliance on the ear feature extraction process. It is because the ear feature analysis model and the threshold might be modeled based on the image of the specific body part.

Figure 5:
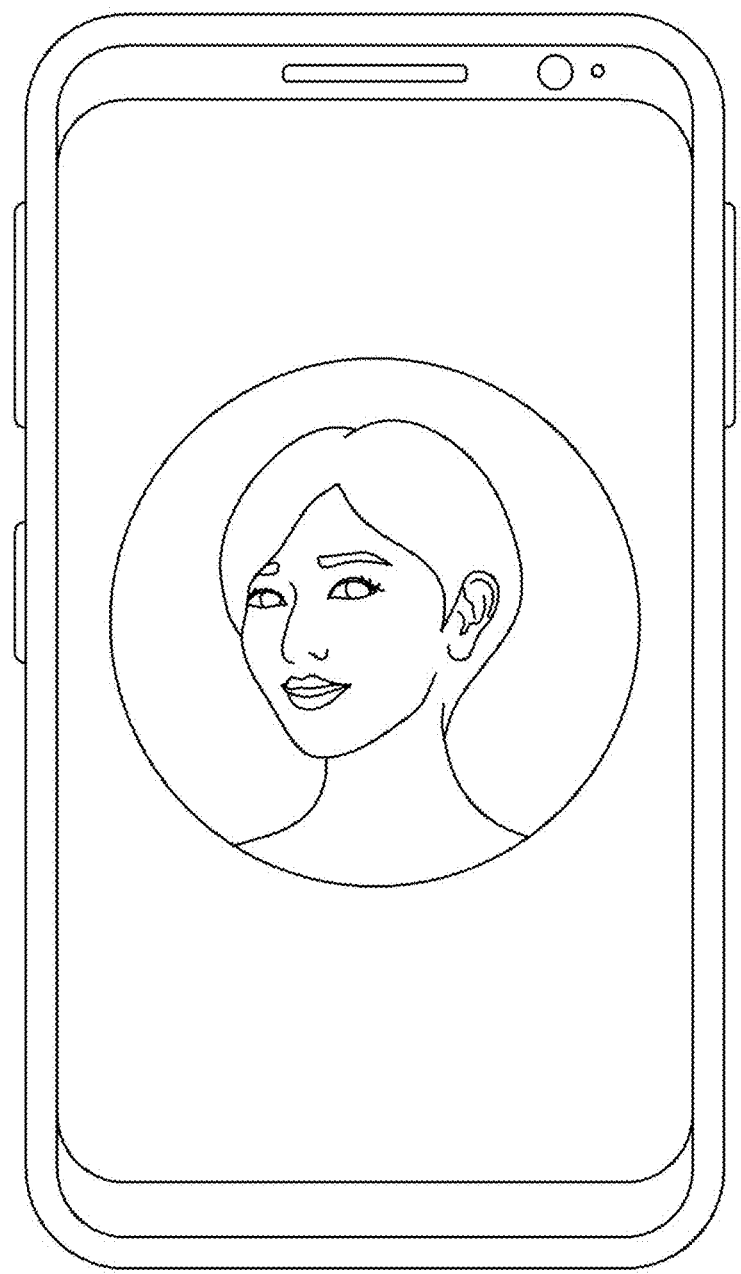
FIG. 5 is a diagram showing a target image according to an embodiment of the present disclosure.

For example, when the ear feature analysis model and the threshold are modeled based on an ear region detected in a front view face image and/or a side view face image, the mobile device 100 may induce the imaging of a front face view having higher percentage of the front face than the side face as shown in FIG. 5, or may induce the imaging of a side face view having higher percentage of the side face than the front face as shown in FIG. 2.

Subsequently, the mobile device 100 detects an ear region in the target image of S410 (S430), and extracts a set of ear features (for example, an ear feature vector) (S450).

In some embodiments, in S450, the mobile device 100 may extract a subset of features related to a global feature (for example, a first feature vector) and/or a subset of features related to a local feature (for example, a second feature vector).

The mobile device 100 calculates ear similarity between the target and the candidate based on the set of ear features of the target and the set of stored ear features of the candidate (S470).

In some embodiments, the set of ear features of the candidate also includes a subset of features related to a global feature and/or a subset of features related to a local feature. Similarity between the features of the target and the features of the candidate by feature is calculated in reliance on the relevant features of the ear. First similarity between the target and the candidate is calculated by applying the first feature vector of the target and the first feature vector of the candidate to the similarity comparison algorithm and/or second similarity between the target and the candidate is calculated by applying the second feature vector of the target and the second feature vector of the candidate to the similarity comparison algorithm. When the first similarity and the second similarity are calculated, ear similarity between the target and the candidate is calculated by concatenating the calculated first and second similarities (S470).

The mobile device 100 determines if the ear similarity of S470 is higher than the preset threshold (Tscore) (S480). When the ear similarity is higher than the threshold (Tscore), the normal lock state is changed to the unlock state (S490).

In some embodiments, when the similarity between the target and the candidate is less than the threshold (Tscore), at least some of the previous steps S410 to S470 may be repeated within a preset number of times.

In some embodiments having a plurality of candidates, when the calculated similarity between a specific candidate and the target is less than the threshold (Tscore) and the feature extraction operation and the identification operation are repeated more than the preset number of times, the mobile device 100 searches for other candidate that matches the target in the database.

In other alternative embodiments, the mobile device 100 may be further configured to perform ear recognition with improved user convenience and precision. These other alternative embodiments are similar to the embodiments of FIG. 4A, and will be described with regard to difference(s).

Referring to FIG. 4B, after obtaining the target image (S410), the mobile device 100 determines the ambient light level of the mobile device 100 (for example, by the light sensor 178) (S423). When the ambient light level of the mobile device 100 is equal to or less than the threshold (Ti), the mobile device 100 provides the target with a notification to adjust the distance between the mobile device and the target. The notification may be a voice notification such as, for example, "your ear is too close", but is not limited thereto, and may be performed by a non-voice such as vibration or a combination thereof.

In addition, when the ambient light level of the mobile device 100 is higher than the threshold (Ti), the mobile device 100 detects a motion change of the mobile device 100 (S425). When the motion change of the mobile device 100 is sensed (for example, by the gyro sensor 178), the shooting angle of the image of the target is corrected based on the motion change of the mobile device.

Figure 7:
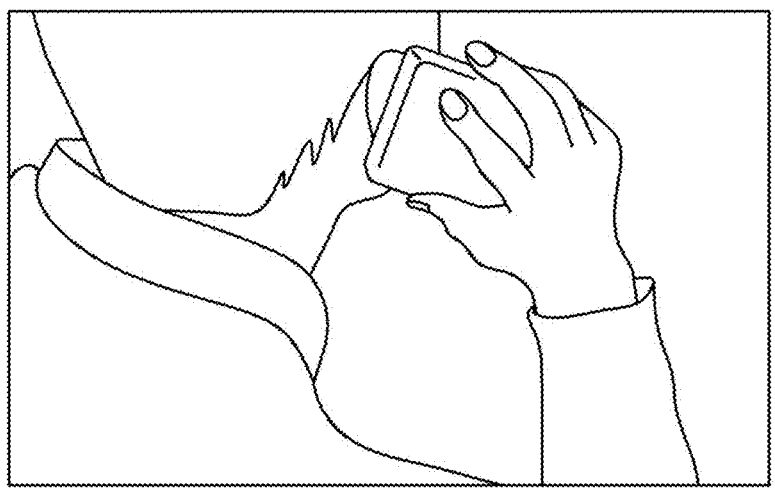
FIG. 7 is a diagram showing a result of correcting direction based on motion information according to an embodiment of the present disclosure.
Figure 7:
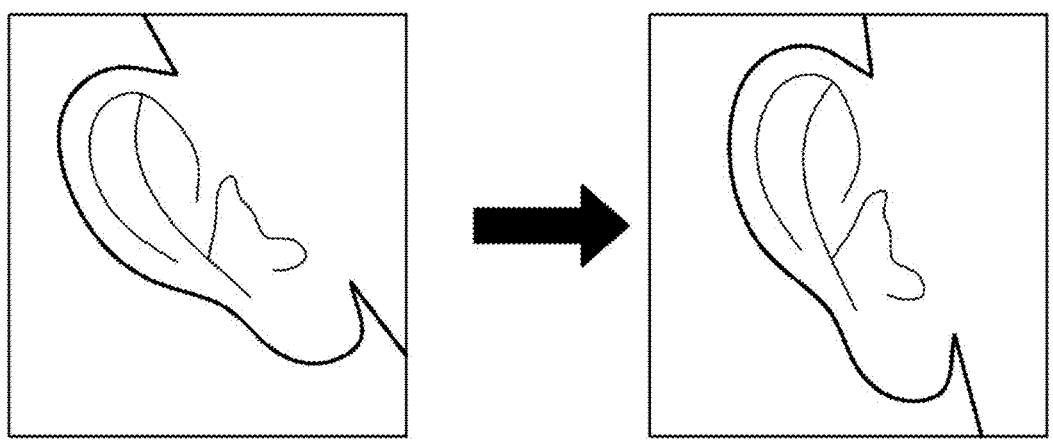

As shown in FIG. 7, when a motion occurs due to the user's hand movement, the image obtained in S410 includes an image before correction. When the motion change is sensed, the mobile device 100 calculates a correction value based on the motion change, and corrects the image of the target to an image having no motion change by applying the correction value. In some embodiments, the correction value may be a value having the same angle and magnitude, but the opposite direction of rotation included in the motion change.

In S430, the mobile device 100 extracts a sub region estimated as an ear region from the target image. The mobile device 100 may be further configured to determine if the extracted sub region includes the actual ear part of the target (S431). When it is determined that the ear part is not actually included in the image of the detection region, a notification for inducing the re-imaging such as "please move your device" may be provided.

When the region extracted in S430 includes the actual ear of the target and is thus determined to be the ear region (S431), determination is made as to whether the detected ear region falls inside a predetermined size range (S433 and S435). The predetermined size range includes a maximum value (Ts_max) and a minimum value (Ts_min).

In some embodiments, when the detected ear region has a size that is equal to or larger than the maximum value (Ts_max), or is equal to or smaller than the minimum value (Ts_min), the mobile device 100 provides a notification for inducing the re-imaging to detect a new ear region falling inside the predetermined size range (S434 and S436). For example, a notification such as "your ear is too far away" or "your ear is too close" may be provided to the target to adjust the distance between the mobile device and the target.

In some other alternative embodiments, instead of providing the notification for inducing the re-imaging to detect a new ear region falling inside the predetermined size range, normalization may be performed so that the size of the obtained ear region fits within the predetermined size range.

The mobile device 100 may perform normalization using zero-padding or cropping, but is not limited thereto, the zero-padding involves padding blanks with black pixels to satisfy the required image size, and the cropping involves expanding the size of the ear region image and cutting off a portion corresponding to the image size required by the mobile device 100 from the expanded image, and the mobile device 100 is configured to perform the normalization operation using various methods for size normalization while maintaining the proportion of the ear.

The size control prevents the geometric deformation and distort of the ear region, thereby preventing an error in ear recognition.

Through these steps S410 to S490, the normal lock state is changed to the unlock state, and the mobile device 100 is unlocked.

Figure 6:
FIG. 6 is a diagram showing a result of releasing normal lock state according to an embodiment of the present disclosure.

In some embodiments, when the normal lock state is changed to the unlock state (i.e., when the normal lock is released), as shown in FIG. 6, the state change result may be displayed. When the normal lock state is changed to the unlock state, the mobile device 100 displays the screen showing at least one application interface object (S490).

Additionally, the mobile device 100 determines that the candidate and the target match (S490). When the candidate is the registered user, the target is identified as the registered user of the mobile device 100.

User Interface Operation—Application Lock and Permission

The above-described interface state may further include an application lock state and a permission state. An application related to the application lock state may include at least one active application that can run in the normal lock state and/or the unlock state. The at least one application corresponds to an event. The event may occur in the normal lock state or unlock state. In some embodiments, the mobile device 100 may display the screen related to the active application corresponding to the occurred event.

In some embodiments, the event includes an incoming call, an incoming message and a voice mail notification. The event is related to providing voice to the user of the mobile device 100. In some embodiments, the incoming message is provided to the user through an operation of converting text to voice.

In the application lock state, at least some of user inputs for the application are ignored. That is, in the application lock state, the mobile device 100 is disallowed to perform at least some of a set of operations of the corresponding application predetermined to be performed in response to the user input for the application. For example, in the application lock state, when an event occurs, the mobile device 100 is configured to respond to a user input related to initiation of an operation of the application corresponding to the event, but not to respond to a user input related to the subsequent operation. At least one active application may respond to a user input that is predetermined in the unlock state or normal lock state.

In the interface permission state (hereinafter, "permission state"), the device 100 is allowed to run the application, and the mobile device 100 detects and responds to a user input corresponding to interaction with an application interface (AU) for the corresponding application. That is, the subsequent operations of the application are allowed. In the permission state, the mobile device 100 detects and responds to a user input for performing the function included in the corresponding application. In the application lock state, the application related to the application lock state and permission state may not perform an operation that may be performed in the permission state.

Hereinafter, for clarity of description, the present disclosure will be described in more detail, taking an incoming call as an example of the event and a phone application as an example of the active application corresponding to the event.

Figure 8:
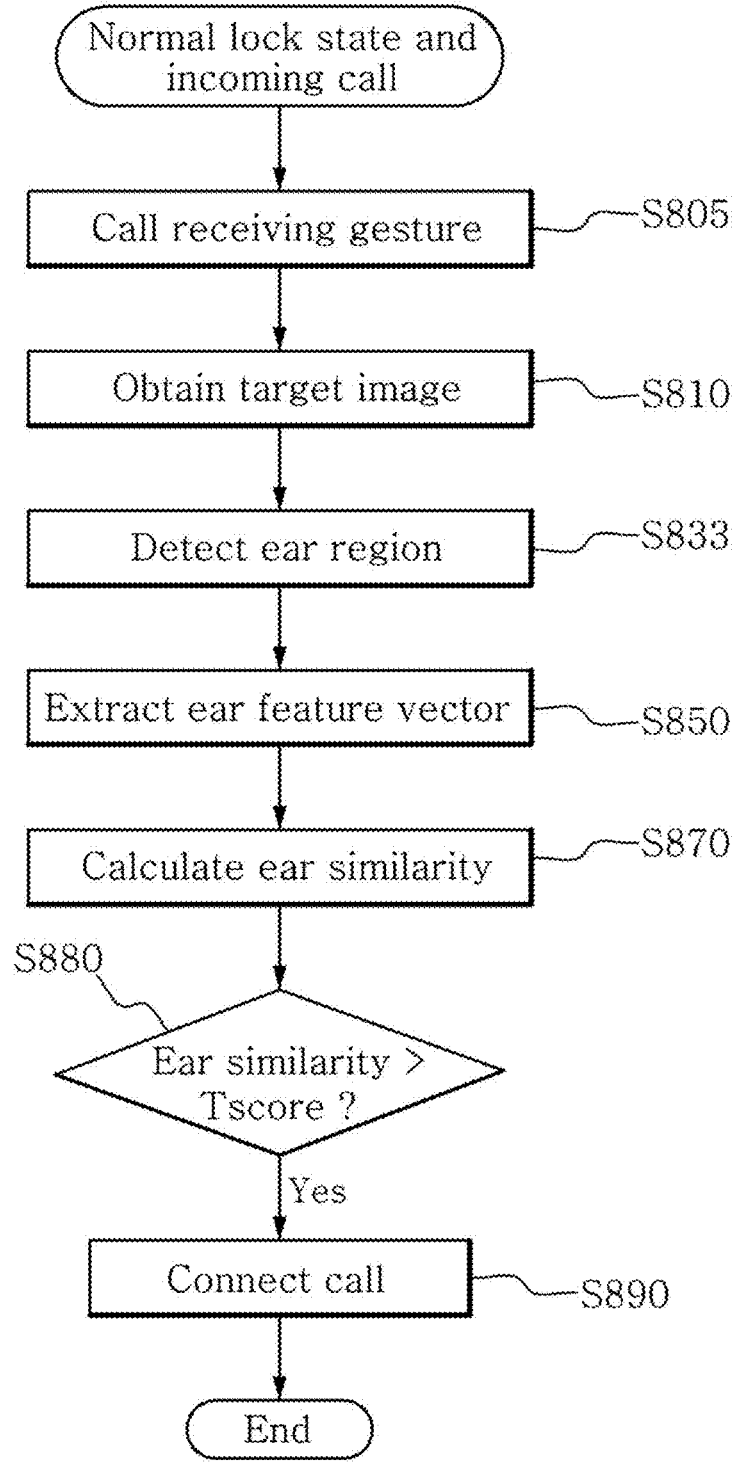
FIG. 8 is a flowchart of a process of unlocking a phone application according to an embodiment of the present disclosure.

FIG. 8 is a flowchart of a process of unlocking a phone application according to an embodiment of the present disclosure.

The embodiment of FIG. 8 is partially similar to the embodiments of FIG. 4A, and will be described with regard to difference(s).

Referring to FIG. 8, the mobile device 100 detects an unlock attempt. The unlock attempt is an attempt to unlock the application, sensed when an incoming call occurs in the normal lock state.

In some embodiments, the unlock attempt determination condition of FIG. 8 may be set to be the same as the unlock attempt of FIG. 4A.

In some other embodiments, the unlock attempt determination condition of FIG. 8 may be different from the unlock attempt of FIG. 4A. The unlock attempt determination condition of FIG. 8 is related to the occurrence of the incoming call, and thus may be set based on a physical change resulting from interaction for receiving the incoming call between the user and the mobile device 100. For example, the unlock attempt determination condition of FIG. 8 may be set to an occurrence of a larger physical change (for example, a larger rotation change, a larger acceleration change, etc.) than the unlock attempt determination condition of FIG. 4A.

In the application lock state, the mobile device 100 only responds to predetermined operations for the phone application, including acceptance or rejection of the incoming call and volume adjustment.

In some embodiments, when the incoming call occurs, the mobile device 100 may display the interface screen showing a notification of the incoming call.

In some embodiments, the unlock attempt of FIG. 8 may include the same user input as the unlock attempt of FIG. 4A. In some other embodiments, the unlock attempt of FIG. 8 may include a user input initiating the operation of the phone application corresponding to the event. For example, the attempt to unlock the application corresponding to the incoming call may include a user input (for example, phone icon movement) initiating an operation for connection of the incoming call, such as acceptance of call reception in the phone application.

When the mobile device 100 senses the unlock attempt, a target image is obtained (S810), an ear region is detected (S830), a set of ear features of the target is extracted (S850), and ear similarity between the target and the candidate is calculated (S880). When the ear similarity is higher than the threshold (Tscore), an operation of the application corresponding to the event is performed.

In some embodiments, the operation of the application corresponding to the event performed after the ear similarity is determined to be higher than the threshold (Tscore) may be an operation of connecting the incoming call. In this case, an ear recognition operation including ear similarity calculation corresponds to an operation of verifying the input accepting the reception of the incoming call. Even in case that the mobile device 100 receives a separate user input accepting the reception of the incoming call, when the ear similarity is determined to be equal to or less than the threshold (Tscore), a call connection is not made.

In some other embodiments, the operation of the application corresponding to the event performed after the ear similarity is determined to be higher than the threshold (Tscore) may be an operation of accepting the reception of the incoming call and an operation of connecting the call. When the ear similarity is determined to be equal to or less than the threshold (Tscore), an operation of rejecting the reception of the incoming call is performed and a call connection is not made. In particular embodiments, call reception may be rejected after the ear recognition operation is repeatedly performed in the range of a predetermined number of times.

That is, in this case, the user may perform a user input for acceptance and connection by taking a gesture for receiving the call by placing the mobile device 100 close to the ear. A separate user input accepting the reception of the incoming call is not required.

In some other embodiments, the target image is obtained in response to the user's call receiving gesture being sensed (S805). In particular embodiments, the target image may be captured in the middle of the call receiving gesture. Here, the middle is any one of paths between the start and the end of the gesture.

For example, for brightness of the mobile device 100, a gesture having a longer distance between the ear and the mobile device 100 is taken before ear recognition is completed, and when a gesture of placing the mobile device 100 closer to the ear is taken after call connection, the target image is obtained in a situation in which a gesture having a longer distance between the ear and the mobile device 100 is taken.

Additionally, the mobile device 100 identifies the user of the mobile device 100 (i.e., whose ear is to be recognized) who receives the incoming call as the registered user, and changes the application lock state to the permission state (S890).

In S890, the normal lock and the application lock are all released. That is, the application lock state is changed to the permission state, and the normal lock state is also changed to the unlock state. Accordingly, after the phone application corresponding to the incoming call finishes running, the mobile device 100 may display the screen showing at least one application interface object.

Figure 9:
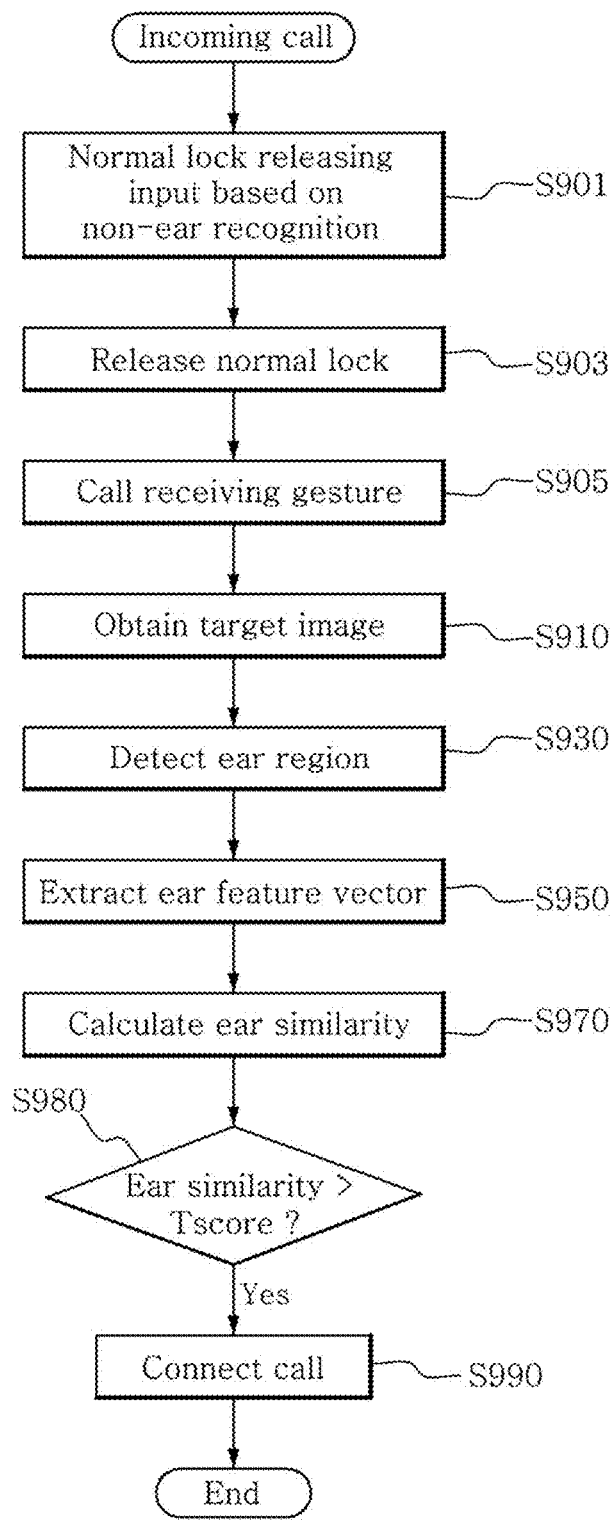
FIG. 9 is a flowchart of a process of unlocking a phone application according to another embodiment of the present disclosure.

FIG. 9 is a flowchart of a process of unlocking a phone application according to another embodiment of the present disclosure.

The embodiment of FIG. 9 is similar to the embodiments of FIG. 8, and will be described with regard to difference(s).

Referring to FIG. 9, the mobile device 100 may release the normal lock based on a different user input other than ear recognition (S901). The user input is an unlock input that is different from ear recognition, and may be an input that does not require image analysis or an input for image analysis that is different from ear recognition. The input that does not require image analysis includes, for example, at least one of touch, a non-touch gesture, typing and voice, but is not limited thereto. Here, the touch includes a pattern input. The input for image analysis that is different from ear recognition may be, for example, iris imaging for iris recognition and fingerprint imaging for fingerprint recognition, but is not limited thereto. The different input for image analysis may be obtained using a signal having a wavelength that is different from the visible range.

Although the normal lock is released in a way that is different from ear recognition, the mobile device 100 may display the screen showing at least one application interface object (S903).

An event may occur in unlock state. For example, as described in FIG. 8 an incoming call may occur. In S903, the mobile device 100 is in application lock state. The mobile device 100 performs an operation of the application corresponding to the event based on the ear recognition operation (S910 to S980).

In case that the event is an incoming call, when the ear similarity is higher than the threshold (Tscore), a call connection operation is performed. In some embodiments, when the ear similarity is higher than the threshold (Tscore), a call acceptance and connection operation may be performed.

In addition, the event further includes a finance related event. The application related to the application lock state may further include an authentication application that can run in normal lock state and/or unlock state. The authentication application includes a sub application that is connected to other application to assist the operation of the other application. For example, the mobile device 100 may include an untact financial application and an authentication application that assists the untact financial application.

The finance related event may be, for example, a variety of untact financial operations such as wire transfer and online transaction. The application corresponding to the event includes a financial application and/or an authentication application that assists untact finance.

In some embodiments, when the ear similarity is higher than the threshold (Tscore), the target may be identified as the registered user, or the untact financial operation may be performed.

It will be obvious to those skilled in the art that the event related operation described above with reference to FIGS. 8 and 9 may be modified based on FIG. 4B.

As described above, the operation of the application corresponding to the event is performed based on ear recognition, thereby omitting a user input for initiating the operation of the application, resulting in increased user convenience, or performing additional identification in unlock state, resulting in enhanced security.

The operation by the method for unlocking a mobile device and the mobile device performing the same according to the embodiments as described above may be, at least in part, implemented in a computer program and recorded in a computer-readable recording medium. For example, it may be implemented in a program product including the computer-readable medium having program code embedded therewith, and may be executed by the processor for performing any or all of the above-described steps, operations or processes.

The computer may be a computing device such as a desktop computer, a laptop computer, a notebook computer, a smart phone or like, and may be any integrated device. The computer is a device having at least one alternative and specialized processor, memory, storage, and networking component (either wireless or wired). The computer may run an operating system (OS) such as, for example, OS that is compatible with Microsoft Windows, Apple OS X or iOS, Linux distribution, or Google Android OS.

The computer-readable recording medium includes all types of recording and identifying devices in which computer-readable data is stored. Examples of the computer-readable recording medium include read only memory (ROM), random access memory (RAM), compact disc read only memory (CD-ROM), magnetic tape, floppy disk, and optical data storage and identification devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

What is claimed is:

1. A method for unlocking a mobile device using authentication based on ear recognition, performed by the mobile device including an imaging unit, a display unit and a processor, the method comprising:
    sensing an unlock attempt in a lock state;
    obtaining an image of a target showing at least part of the target's body in the lock state;
    providing the target with a notification to adjust a distance between the mobile device and the target, based on a determination that a brightness level of the mobile device is equal to or lower than a threshold;
    extracting a set of ear features of the target from the image of the target, when the image of the target includes at least part of the target's ear; and
    determining if the extracted set of ear features of the target satisfies a preset condition.

2. The method for unlocking a mobile device according to claim 1, wherein extracting the set of ear features of the target comprises:
    applying the detected ear region to a global feature analysis model configured to extract a set of first features for a global feature of the ear; and
    applying the detected ear region to a local feature analysis model configured to extract a set of second features for a local feature of the ear.

3. The method for unlocking a mobile device according to claim 2, wherein the global feature analysis model or the local feature analysis model is configured to extract the set of first features or the set of second features using multiple images obtained from a same training target as a training image, and
    the multiple images share at least part of the training target's ear.

4. The method for unlocking a mobile device according to claim 2, wherein the global feature of the ear includes at least one of a contour of the ear and a structure of the ear, and
    the local feature of the ear includes a local pattern present in the ear.

5. The method for unlocking a mobile device according to claim 2, wherein determining if the extracted set of ear features of the target satisfies the preset condition comprises:
    calculating similarity of the ear features between the target and a user of the mobile device by comparing the set of first features and the set of second features with stored set of first features and set of second features of the user; and changing a first interface state to a second interface state when a similarity match level is higher than a predetermined threshold.

6. The method for unlocking a mobile device according to claim 5, wherein calculating the similarity of the ear features between the target and the user comprises:

calculating a first similarity representing a similarity level of the global features of the ear between the target and the user of the mobile device by comparing the set of first features of the target with the stored set of first features of the user;

calculating a second similarity representing a similarity level of the local features of the ear between the target and the user of the mobile device by comparing the set of second features of the target with the stored set of second features of the user; and calculating the similarity of the ear features between the target and the user by concatenating the first similarity and the second similarity.

7. The method for unlocking a mobile device according to claim 2, further comprising:

correcting a shooting angle of the target image or the image of the ear region based on a motion change of the mobile device, when the motion change of the mobile device is sensed, before applying to the global feature analysis model or the local feature analysis model.

8. The method for unlocking a mobile device according to claim 1, wherein the lock state includes a normal lock state, and the method for unlocking a mobile device further comprises:

displaying a screen showing at least one application interface object, when the extracted set of ear features of the target is determined to satisfy the preset condition.

9. The method for unlocking a mobile device according to claim 8, wherein the lock state further includes an unlock state, and the method for unlocking a mobile device further comprises:

changing from the normal lock state to the unlock state, and notifying the state change, before displaying the screen showing the at least one application interface object.

10. The method for unlocking a mobile device according to claim 1, wherein the lock state includes a normal lock state and an application lock state, and the method for unlocking a mobile device comprises:

displaying an interface screen corresponding to an occurred event, when the event occurs in the normal lock state; and performing an operation of an application corresponding to the event, after the extracted set of ear features of the target is determined to satisfy the preset condition.

11. The method for unlocking a mobile device according to claim 10, wherein the event includes an incoming call, and connection of the incoming call is performed, after the extracted set of ear features of the target is determined to satisfy the preset condition.

12. The method for unlocking a mobile device according to claim 1, wherein the lock state includes a normal lock state, an unlock state and an application lock state, and the method for unlocking a mobile device further comprises:

receiving an unlock input that is different from ear recognition and displaying a screen showing at least one application interface object;

displaying an interface screen corresponding to an occurred event, when the event occurs in the unlock state; and performing an operation of an application corresponding to the event, after the extracted set of ear features of the target is determined to satisfy the preset condition, wherein the image of the target is obtained after the event occurs.

13. The method for unlocking a mobile device according to claim 12, wherein the different unlock input includes at least one of touch, a non-touch gesture, typing, voice, and imaging of a different body part from the ear.

14. The method for unlocking a mobile device according to claim 12, wherein the event includes an incoming call, and acceptance of reception of the incoming call is performed, after the extracted set of ear features of the target is determined to satisfy the preset condition.

15. The method for unlocking a mobile device according to claim 1, further comprising:

determining if the detected ear region includes at least part of the target's ear, before extracting the set of ear features;

determining if a size of the detected ear region falls inside a predetermined size range, when the detected ear region includes the at least part of the target's ear; and providing the target with a notification to adjust a distance between the mobile device and the target to obtain the ear region falling inside the predetermined size range, when the size of the detected ear region is outside of the predetermined size range.

16. The method for unlocking a mobile device according to claim 1, wherein sensing the unlock attempt in the lock state comprises:

determining that the unlock attempt is sensed, when sensing at least one of a change in rotation angle of the mobile device within a preset range for a preset unit time, and brightness maintained within the preset range for the preset unit time; and activating ear recognition for unlocking.

17. A non-transitory computer-readable recording medium that is readable by a computing device including a processor and storing program instructions executable by the computing device, wherein the program instructions are executed by a processor of the computing device, the program instructions cause the processor to:

sense an unlock attempt in a lock state;

obtain an image of a target showing at least part of the target's body in the lock state;

provide the target with a notification to adjust a distance between the mobile device and the target, based on a determination that a brightness level of the mobile device is equal to or lower than a threshold;

extract a set of ear features of the target from the image of the target, when the image of the target includes at least part of the target's ear; and determine if the extracted set of ear features of the target satisfies a preset condition.

18. A mobile device, comprising:

an imaging device to obtain an image of a target;

a display;

a processor; and a memory to store a program configured to be executed by the processor, wherein the program includes instructions for performing the steps of:

obtaining an image of a target showing at least part of the target's body in a lock state;

providing the target with a notification to adjust a distance between the mobile device and the target, based on a determination that a brightness level of the mobile device is equal to or lower than a threshold;

extracting a set of ear features of the target from the image of the target, when the image of the target includes at least part of the target's ear; and determining if the extracted set of ear features of the target satisfies a preset condition.

19. The mobile device according to claim 18, wherein the lock state includes a normal lock state, and the program further includes instructions for performing the step of:

displaying a screen showing at least one application interface object, when the extracted set of ear features of the target is determined to satisfy the preset condition.

20. The mobile device according to claim 18, wherein the lock state includes a normal lock state and an application lock state, and the program further includes instructions for performing the steps of:

displaying an interface screen corresponding to an occurred event, when the event occurs in the normal lock state; and performing an operation of an application corresponding to the event, after the extracted set of ear features of the target is determined to satisfy the preset condition.

21. The mobile device according to claim 18, further comprising:

at least one of a touch unit to obtain a touch input, other input unit to obtain an input that is different from touch, and a microphone, wherein the lock state includes a normal lock state, an unlock state and an application lock state, and the program further includes instructions for performing the steps of:

receiving an unlock input that is different from ear recognition and displaying a screen showing at least one application interface object;

displaying an interface screen corresponding to an occurred event, when the event occurs in the unlock state; and performing an operation of an application corresponding to the event, after the extracted set of ear features of the target is determined to satisfy the preset condition.

\* \* \* \* \*